Figure 1:
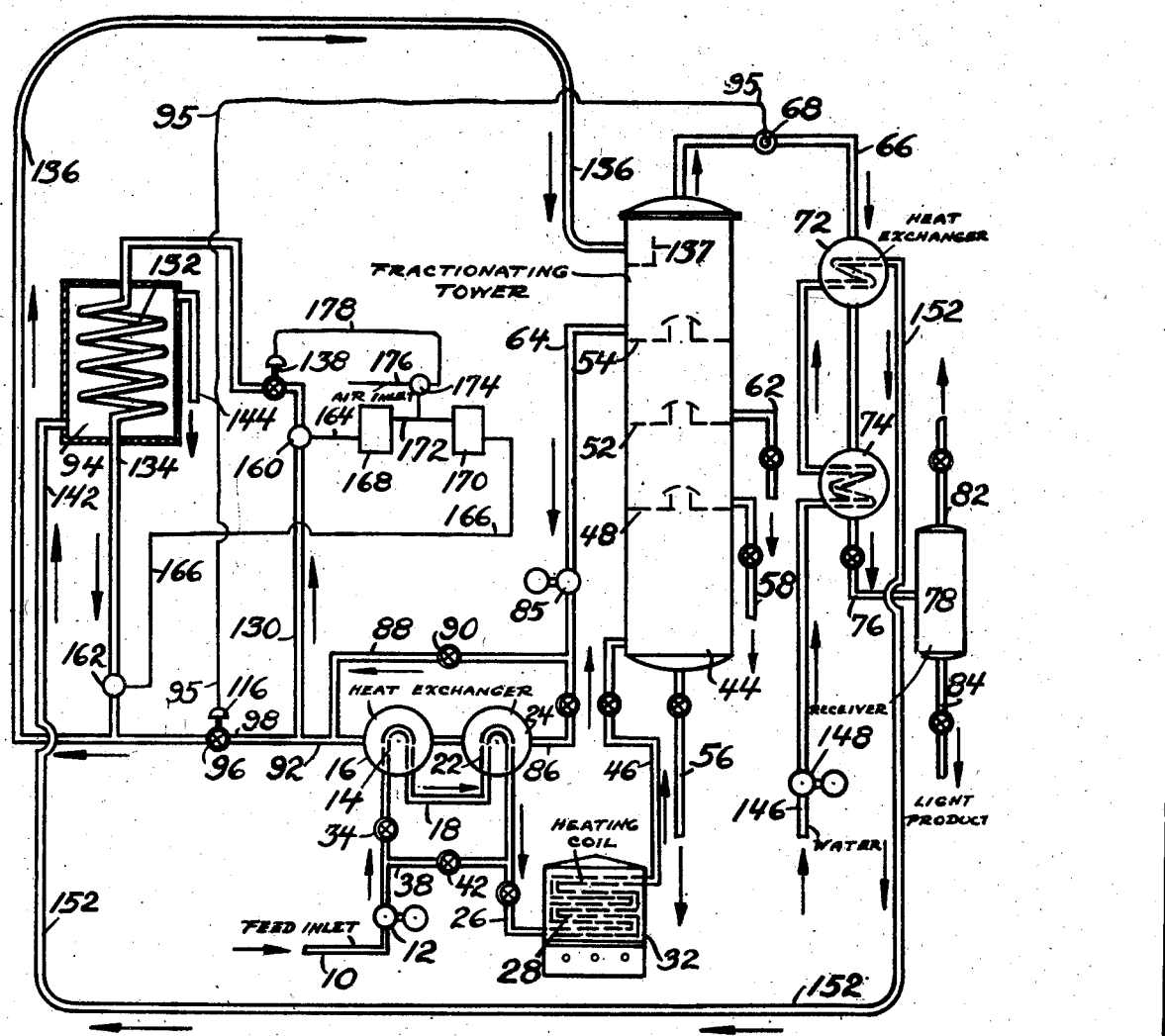

July 23, 1946.  W. C. WILSON  2,404,677

FRACTIONAL DISTILLATION

Filed Oct. 29, 1941

Warren C. Wilson Inventor
By _____ Attorney

UNITED STATES PATENT OFFICE 2,404,677

FRACTIONAL DISTILLATION

Warren C. Wilson, Rahway, N. J., assignor to Standard Oil Development Company, a corporation of Delaware Application October 29, 1941, Serial No. 416,980

9 Claims. (Cl. 196—94)

This invention relates to the fractionation of vapor mixtures and more particularly relates to controlling the temperature of the top of a fractionating tower by controlling the temperature of the reflux liquid introduced into the top of the fractionating tower.

In the fractionation of vapors containing different constituents such as hydrocarbon vapors it is usual practice to control the temperature at the top of the fractionating tower by regulating the quantity of reflux liquid introduced into the top of the fractionating tower. The reflux liquid may be cooled in various ways but if the rate of refluxing is held constant and the temperature is controlled by regulating the quantity of water passed to the coolers there is danger of vaporization of the water and by loss of water due to vaporization corrosion of the heat exchange coil or surface will result. Water used in these coolers is in many cases salt water which is more corrosive at higher temperatures.

According to my invention, the reflux liquid is withdrawn from the fractionating tower at a constant rate and passed in indirect heat exchange with fresh feed and another medium to recover heat and then the partially cooled reflux liquid is passed to another heat exchanger where cooling water is used. When using the reflux liquid as a heat exchange medium, it is desirable to obtain maximum heat recovery before cooling with water.

According to my invention, the danger of vaporization of the cooling water and resultant corrosion of parts of the heat exchanger is avoided by holding substantially constant the quantity of water passing to the cooler or coolers and regulating the temperature of the reflux liquid by by-passing a portion of the partly cooled reflux liquid around the heat exchangers or coolers.

According to my invention maximum heat is recovered from the reflux and put into the fresh feed without running the danger of operating the cooler at salt water temperatures considerably in excess of those required to prevent corrosion. In order to fractionate the vapors it is necessary to vaporize the feed stock in the bottom of the tower and then remove heat somewhere up the tower. This heat removal can be accomplished by condensing vapors and refluxing the condensed liquid, but according to my invention, the heat is removed by removing a sidestream of hot liquid, cooling this liquid outside the tower, and then reinjecting it. The reinjected cooled liquid condenses a part of the vapors coming up the tower and in this way provides the necessary liquid reflux for fractionating the hydrocarbon vapors.

In my process the liquid sidestream is drawn off and run through heat exchanger equipment and the recovered heat is transferred to the fresh feed. In this manner the heat is recovered from the top of the tower. With my invention it is desirable to circulate the maximum quantity of liquid from the tower in order to increase the heat transfer coefficient of the heat exchangers. Also, it is desirable to transfer as much heat as possible from the liquid to the fresh feed in order to secure maximum efficiency. In order to remove the correct amount of heat, however, it is necessary to provide a cooler or coolers in addition to the heat exchanger equipment so that when the amount of heat transferred from the hot liquid to the fresh feed is not sufficient to give the required fractionation in the tower, the additional heat may be removed by the cooler. This means then that as the temperature of the fresh feed is increased or as the heat exchanger equipment becomes fouled the load on the cooler is increased.

If all of the liquid after passing through the heat exchangers were to be passed to the cooler, it would then be necessary to regulate the quantity of water going to the coolers. This could either be done by hand or by an automatic control valve in the water line. However, if this were done there would be times when very little if any heat would have to be removed from the cooler and under that condition the valve controlling the water to the cooler would be closed and without replenishing the supply of water the temperature of the water in the cooler would gradually rise until it reached the vaporization temperature of water and it would then be evaporated. With such a condition there would be severe corrosion of the cooler. In order to prevent this the equipment is laid out so that sufficient water is always flowing through the cooler to take care of the maximum heat load. Then if less than that maximum heat load is required the reflux liquid is by-passed around the cooler which means that very little if any temperature rise would occur on the water going through the cooler and at no time would the temperature of the water reach the vaporization point and thereby start corrosion.

Figure 2:
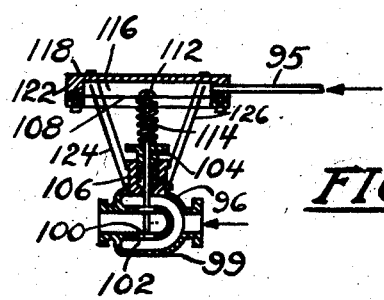

In the drawing:

Figure 1 represents one form of apparatus which may be used to carry out my invention; and Figure 2 represents one form of control valve which may be used.

Referring now to the drawing, the reference character 10 designates a line through which the liquid to be fractionated is passed by pump 12. Where hydrocarbon liquids are to be fractionated, the oil feed comprises light naphtha or heavy naphtha or any other desired hydrocarbon fraction from which it is desired to separate suitable fractions. Liquid mixtures other than hydrocarbon mixtures may be fractionated according to my invention.

The liquid feed is passed through coil 14 in heat exchanger 16 and then passed through line 18 and through another coil 22 in a second heat exchanger 24 for preheating the liquid feed. During passage through the coils 14 and 22, the liquid feed is indirectly contacted with reflux liquid withdrawn from a fractionating tower to be hereinafter described. If desired, only one heat exchanger may be used or the feed may be passed through other heat exchangers for additional heating. The preheated liquid feed is passed through line 26 and through the heating coil 28 in a heater 32 to bring the liquid feed to the desired temperature.

Inlet line 10 is provided with a valve 34 and outlet line 26 is provided with a valve 42 for by-passing the heat exchangers 16 and 24 in which event the liquid feed is passed through by-pass line 38 having a valve 42. The heated liquid feed from the heating coil 28 is introduced into the lower portion of a fractionating tower 44 through line 46. The fractionating tower 44 is provided with trap-out trays 48, 52 and 54. The heated vapors from the liquid feed pass upwardly through the fractionating tower and are fractionated to separate lighter constituents from heavier constituents. The fractionating tower may be of any suitable construction such as a bubble tower.

The trap-out trays are provided so that different fractions may be removed from the fractionating tower 44. The fraction having the highest boiling range is withdrawn from the trap-out tray 48. A lighter fraction is withdrawn from the next higher trap-out tray 52 and a lighter fraction is withdrawn from the top trap-out tray 54. The unvaporized heavier constituents collect in the bottom of the fractionating tower 44 and are withdrawn therefrom through line 56. The fraction from the lowest trap-out tray 48 is withdrawn through line 58 and may be further treated to separate desired constituents therefrom. The fraction withdrawn from trap-out tray 52 is passed through line 62 and may be further treated as desired to separate desired constituents therefrom. The relatively light fraction collecting on the top trap-out tray 54 is withdrawn through line 64 and is cooled as will be hereinafter more fully described to provide cool reflux liquid for the fractionating tower 44.

The uncondensed vapors forming the lightest portion of the liquid feed pass overhead through line 66 which is provided with a temperature responsive device 68 for controlling the temperature of the reflux liquid introduced into the fractionating tower 44 as will be hereinafter described in greater detail. The overhead vapors are passed through heat exchangers 72 and 74 where they are indirectly contacted with cooling water to condense and cool the vapors. The condensed and cooled vapors are passed through line 76 to a gas separator 78 in which the gases are separated from liquid, the gases passing overhead through line 82 and the liquid being withdrawn through bottom line 84. The liquid withdrawn through line 84 is the lightest fraction separated from the liquid feed.

Returning now to the reflux liquid withdrawn from top trap-out tray 54, the reflux liquid is passed through line 64 by pump 85 and then through valved line 86 through the heat exchangers 16 and 24, previously described, where the reflux liquid is cooled by indirect contact with the liquid feed introduced through line 10. If desired, the reflux liquid may be in part or all by-passed around the heat exchangers 16 and 24 through by-pass line 88 having a valve 90.

The cooled reflux liquid is then passed through line 92 and through cooler 94 for cooling the reflux liquid to the desired temperature. The cooler 94 is preferably a closed cooler. The temperature responsive device 68 in line 66, hereinbefore described, is connected by a line 95 to a control valve 96 in line 98 which communicates with line 92. Device 68 may control valve 96 by electrical means, by air pressure or in any suitable manner. For example, the temperature at 68 in line 66 is transmitted to a temperature control instrument such as a Leeds and Northrup "Micromax," which in turn controls the pressure on the diaphragm valve 96. By regulating the air pressure on the diaphragm of valve 96 in response to temperature changes, the valve is either raised or lowered and this in turn regulates the flow through line 98. Other control means may be used. These control valves and associated parts are well known equipment available on the market and further detailed description of the equipment is not believed necessary.

As shown in the drawing, the temperature responsive device 68 is a bulb or the like containing a liquid or liquids having desired vapor pressures at the operating temperatures. An increase in temperature in line 66 results in an increase in pressure in device 68 which is transmitted through line 95 to the pressure responsive valve 96. The valve 96 and associated parts shown in Figure 2 will now be described.

The control valve 96 comprises a valve housing 99, a valve 100 and a valve seat 102. Valve 100 has a valve stem 104 passing through a gland packing 106. The upper end of stem 104 is secured to a movable member or diaphragm 108 at 112. Positioned between diaphragm 108 and packing 106 is a spring surrounding stem 114. The diaphragm housing 116 has a fixed rear wall 118 and side wall 122 forming a cup shaped chamber to which the diaphragm 108 is secured. Housing 116 is rigidly secured to the valve housing 99 by members 124 and 126. Tube or line 95 communicates with the housing 116.

From the above it will be seen that as the temperature at 68 increases, the liquid in temperature responsive device will have its temperature increased and the pressure in line 95 will increase. The increase in pressure will move diaphragm 108 down against the action of spring 114 to close or partly close valve 100 and this will cause the liquid to be passed through line 130 and cooling coil 132 in the cooler 94 to reduce the temperature of the reflux liquid.

The cooled liquid from the coil 132 is then passed through line 134 where it joins the reflux liquid by-passed around the cooler 94 and passing through line 98. The reflux liquid is then passed through line 136 and introduced into the top portion of the fractionating tower 44 above the top trap-out tray 54. Preferably, the relatively cooled reflux liquid is introduced into a splash pan 137. Line 130 is provided with a differential pressure valve 138, hereinafter described in greater detail, to insure satisfactory operation of the control valve 96.

If the temperature at 68 decreases the pressure in housing 116 on control valve 96 will decrease and spring 114 will force the diaphragm 108 upwardly to open valve 100.

The cooling water for the cooler 94 is introduced through line 142 and overflows through line 144. According to my invention, the amount of water passing to the cooler 94 is not regulated or controlled but the cooler is kept full of water all of the time by using an excess of the maximum requirement. In this way corrosion of the apparatus due to vaporization of the water is eliminated. The temperature of the reflux liquid is controlled by by-passing the cooler 94. In order to obtain the desired temperature, all or a portion of the reflux liquid is by-passed around the cooler 94.

The cooling water used in the cooler 94 is preferably first used for cooling overhead vapors from the fractionating tower 44. The cooling water may comprise any available water such as salt water, well water, etc. The cooling water is passed through line 146 by pump 148 and through the heat exchangers 74 and 72 where the cooling water indirectly contacts the vapors passing through line 66. During this heat exchange, the cooling water has its temperature raised a small amount. The cooling water is then passed through line 152 and introduced into the cooler 94 through line 142 as above described.

If desired, the fractionating tower 44 at its lower portion may be provided with a reboiler.

Differential pressure valve 138 will now be described. Two pressure connections 160 and 162 are taken as indicated, one on each side of cooler 94. These pressure connections are connected by lines 164 and 166 to a differential pressure regulator instrument, such as is manufactured by the American Meter Company or the Foxboro Meter Company, and which is shown diagrammatically as including pressure chambers 168 and 170 connected by a line 172. Line 172 communicates with a valve member 174 into which air is supplied by line 176. The air under pressure supplied through valve member 174 depends on the differential pressures in chambers 168 and 170 and is passed through line 178 to control valve 138. This control instrument regulates the air pressure on diaphragm valve 138 either raising or lowering the valve in order to maintain a constant differential pressure across the cooler 94. This differential pressure regulator is preferably used in order to take care of the wide range in pressure drop which may occur across cooling coil 132 when only a very small part of the total liquid being circulated is run through the cooling coil 132 and when the major portion of the liquid is being run through the cooler. In order to operate valve 96 properly there must be a fairly constant differential pressure across the cooling coil. When a large portion of the stock is going through the cooling coil a pressure drop is built up by the resistance to the flow of this liquid. However, when only a small portion is going through the cooling coil there would be practically no resistance and therefore no pressure drop. Valve 138 merely holds this differential pressure constant. Other means may be used to accomplish this result.

While the apparatus may be used generally for the fractionation of liquid mixtures, it is especially adapted for the separation of hydrocarbon mixtures into desired fractions. One example of fractionating hydrocarbon oils will be given. A hydrocarbon mixture such as a heavy naphtha having an A. P. I. gravity of about 50° and having an initial boiling point of about 200° F. and a final boiling point of 435° F. is passed through the heater 28 and heated to a temperature of about 625° F. while maintained under pressure of about 50 lbs. per square inch gauge. The vapors are fractionated in the fractionating tower 44. Unvaporized residual oil withdrawn from the bottom of the fractionating tower 44 through line 56 has a boiling range of about 560° F. to about 700° F. and has an A. P. I. gravity of about 26°.

The hydrocarbon fraction withdrawn from the lowest trap-out tray 48 has an A. P. I. gravity of about 36° and an initial boiling point of about 400° F. and a final boiling point of about 620° F. This fraction is withdrawn at a temperature of about 360° F. The fraction withdrawn from the trap-out tray 52 has an A. P. I. gravity of about 44.2°, an initial boiling point of about 275° F. and a final boiling point of about 390° F. The lighter fraction withdrawn from the trap-out tray 52 is at a temperature of about 310° F. The reflux liquid withdrawn from the top trap-out tray 54 has an A. P. I. gravity of about 60°, an initial boiling point of about 100° F. and a final boiling point of about 320° F. The reflux liquid withdrawn through line 64 is at a temperature of about 225° F.

The vapors leaving the top of the fractionating tower are at a temperature of about 225° F. and after being condensed by passing through the coolers and condensers 72 and 74, the distillate collected in the separator 78 forms the lightest fraction of the naphtha. This light distillate has an A. P. I. gravity of 62°, an initial boiling point of about 60° F. and a final boiling point of about 290° F. In order to maintain the temperature of the top of the tower at about 225° F. and further to obtain the desired amount of fractionation, the reflux liquid is returned to the top of the tower and the splash pan 137 at a temperature of about 150° F. The ratio of the reflux to the vapors passing overhead is about 4 to 1 by weight.

The cooling water is introduced into the cooler 94 at a substantially constant rate to maintain the cooler full of cooling water.

The reflux liquid is passed through heat exchangers 16 and 24 to recover heat from the reflux liquid. The reflux liquid has its temperature reduced to about 200° F. after having passed through the heat exchangers 16 and 24. In this way the maximum amount of heat is recovered from the reflux liquid. The temperature of the reflux liquid is controlled by the temperature responsive device 68 in the outlet line 66 from the fractionating tower 44. If the vapors passing overhead through line 66 from the fractionating tower 44 are at too low a temperature, the reflux liquid is too cold and the temperature responsive device 68 moves the control valve 96 toward open position to permit by-passing of the reflux liquid through lines 98 and 136 around the cooler 94.

If the vapors passing overhead through line 66 are at too high a temperature, the reflux liquid temperature is too high in which event the temperature responsive device 68 effects movement of the control valve 96 in line 98 toward closed position and more of the reflux liquid is passed through line 130 and coil 132 in cooler 94.

The side streams taken through lines 58 and 62 may be passed to separate stripping towers to separate lighter constituents therefrom which are preferably returned to the fractionating tower 44.

If desired, instead of controlling the process with a temperature responsive device at the top of the tower 44, a similar arrangement may be used to regulate the temperature at any place in the tower where the stock is to be circulated through a water cooler.

Other hydrocarbon mixtures may be fractionated as for example hydrocarbon mixtures resulting from the cracking of hydrocarbon oils or heavier oils may be fractionated to separate them into desired fractions and my invention may be used in fractionating these mixtures. Or, other mixtures may be fractionated.

While one form of apparatus has been shown for carrying out my invention and one specific example has been disclosed, it is to be understood that these are by way of illustration only and various changes and modifications may be made without departing from the spirit of the invention.

I claim:

1. In the fractionation of mixed vapors in a fractionating zone to separate desired constituents, the steps of removing reflux liquid from the upper portion of said fractionating zone at a constant rate, passing the reflux liquid through a cooler, passing a cooling medium through said cooler at a substantially constant rate in excess of the maximum cooling required and regulating the temperature of the reflux liquid to be returned at a constant rate to said fractionating tower by by-passing at least a portion of the reflux liquid around said cooler, the relative flow of the reflux liquid through and around said cooler being controlled by the temperature in the upper portion of said fractionating zone.

2. In the fractionation of mixed vapors in a fractionating zone to separate desired constituents, the steps of removing reflux liquid from the upper portion of said fractionating zone at a constant rate, passing the reflux liquid in heat exchange relation with the liquid feed passing to said fractionating zone to obtain maximum heat recovery from the reflux liquid, then passing the partly cooled reflux liquid through a water cooler, passing water through said cooler at a substantially constant rate in excess of the maximum cooling required and regulating the temperature of the reflux liquid to be returned at a constant rate to said fractionating tower by by-passing at least a portion of the reflux liquid around said cooler, the relative flow of the reflux liquid through and around said water cooler being controlled by the temperature in the upper portion of said fractionating zone.

3. A method of fractionating liquids comprising mixtures of different constituents which comprises heating a liquid feed and introducing it into a fractionating zone, fractionating the vapors to separate lower boiling constituents from higher boiling constituents, passing vapors of lower boiling constituents overhead, withdrawing a relatively light liquid from the upper portion of said fractionating zone at a constant rate, passing the withdrawn relatively light liquid through a cooler, supplying a cooling medium to said cooler at a substantially constant rate in excess of the maximum cooling required, by passing at least a portion of the relatively light liquid around said cooler, returning the combined cooled relatively light liquid at a constant rate to said fractionating zone as reflux liquid, and controlling the relative amounts of the relatively light liquid passing through and around said cooler by the temperature in the upper portion of said fractionating zone.

4. A method according to claim 1 wherein the reflux liquid withdrawn from the upper portion of said fractionation zone is passed in indirect heat exchange with fresh liquid feed of said fractionation zone, before it is passed through said cooler.

5. A method according to claim 1 wherein the differential pressure across said cooler is kept substantially constant independent of the amount of reflux liquid passed through said cooler.

6. A method according to claim 3 wherein the relatively light liquid withdrawn from the upper portion of said fractionating zone is passed in indirect heat exchange with the liquid feed before it is passed through said cooler to obtain maximum heat recovery from the relatively light liquid.

7. A method according to claim 3 wherein the relatively light liquid withdrawn from the upper portion of said fractionating zone is passed in indirect heat exchange with the liquid feed before it is passed through said cooler and wherein further the cooling medium is water and the water before being passed to said cooler is passed in indirect heat exchange with the overhead vapors from said fractionating zone to cool and condense the overhead vapors.

8. A method according to claim 1 wherein hydrocarbon mixtures are fractionated to separate lower boiling hydrocarbons from condensate oil.

9. A method according to claim 2 wherein hydrocarbon mixtures are fractionated to separate lower boiling hydrocarbons from condensate oil.

WARREN C. WILSON.